US008865318B2

(12) United States Patent
Maes et al.

(10) Patent No.: US 8,865,318 B2
(45) Date of Patent: Oct. 21, 2014

(54) PROCESS FOR THE ACETYLATION OF WOOD ELEMENTS

(75) Inventors: Michel Maes, Arnhem (NL); Beno Pol, Arnhem (NL)

(73) Assignee: Titan Wood Limited (GB)

( * ) Notice: Subject to any disclaimer, the term of this patent is extended or adjusted under 35 U.S.C. 154(b) by 0 days.

(21) Appl. No.: 13/577,157

(22) PCT Filed: Feb. 4, 2011

(86) PCT No.: PCT/GB2011/050202
§ 371 (c)(1),
(2), (4) Date: Sep. 19, 2012

(87) PCT Pub. No.: WO2011/095824
PCT Pub. Date: Aug. 11, 2011

(65) Prior Publication Data
US 2013/0209822 A1    Aug. 15, 2013

(30) Foreign Application Priority Data

Feb. 4, 2010    (GB) .................................. 1001750.7
Dec. 30, 2010    (GB) .................................. 1022090.3

(51) Int. Cl.
*B32B 5/16*    (2006.01)

(52) U.S. Cl.
USPC ........ 428/532; 428/536; 428/537.1; 428/402; 428/323; 162/9; 162/25; 162/27; 264/109

(58) Field of Classification Search
USPC .......... 428/532, 536, 537.1, 402, 323; 162/9, 162/25, 27; 264/109
See application file for complete search history.

(56) References Cited

U.S. PATENT DOCUMENTS 6,632,326 B1 *    10/2003    Hirano et al. ..................... 162/9

FOREIGN PATENT DOCUMENTS

| GB | 2456915 | * | 8/2009 |
| GB | 2456915 A | | 8/2009 |
| WO | 82/01851 A1 | | 6/1982 |
| WO | 9523168 A1 | | 8/1995 |
| WO | WO95/23168 | * | 8/1995 |

OTHER PUBLICATIONS

International Search Report dated Jun. 14, 2011, issued for corresponding PCT/GB2011/050202.
Chow P. et al., "Properties of Hardboard made from Acetylated Aspen and Southern Pine," Wood and Fiber Science, 1996, 28(2) , pp. 252-258.
Rowell R.M. et al., "Dimensional Stability of Aspen Fiberboard made from Acetylated Fiber," Wood and Fiber Science, 1991, 23(4), pp. 558-566.
Miljkovic J et al., "The acetylation of pine and beech for particleboard production," J. Serb. Chem. Soc. 1994, 59(4), pp. 255-264.
Vick C. B. et al., "Acetylated isocyanate-bonded flake boards after Accelerated Aging," Holz als Roh-und Werkstoff, 1991, 49, pp. 221-228.
Patent Examination report received in corresponding Australian Patent Application No: 2011212184 issued Jun. 16, 2014.

* cited by examiner

*Primary Examiner* — Leszek Kiliman
(74) *Attorney, Agent, or Firm* — Banner & Witcoff, Ltd.

(57) ABSTRACT

A composite wood product containing acetylated wood elements characterized by an average value in thickness swelling not exceeding 5% after subjection to 25 wet-dry/freeze-thaw cycles as described in Table II. Alternative characterizations include moduli of elasticity and rupture, and bending strength. A two stage process for the acetylation of wood elements is also described.

17 Claims, No Drawings

PROCESS FOR THE ACETYLATION OF WOOD ELEMENTS

RELATED APPLICATION DATA

This application is a National Stage Application under 35 U.S.C. 371 of co-pending PCT application PCT/GB2011/050202 designating the United States and filed Feb. 4, 2011; which claims the benefit of GB patent application number 1001750.7 and filed Feb. 4, 2010 and GB patent application number 1022090.3 and filed Dec. 30, 2010 each of which are hereby incorporated by reference in their entireties.

The invention relates to plain or decorative sheets and/or mouldings, in particular for indoor or outdoor applications in buildings being pressed single- or multi lap core layers made from wood strands, wood particles, wood fibres and/or from cellulose fibres, where the wood elements have been acetylated, impregnated with a synthetic resin as binder, heat-hardened and pressed. For convenience, these sheets/mouldings will be referred to as "composites", and typically include engineered wood products such as medium density fibreboard, oriented strand board and particle board, derived primarily from soft wood starting materials such as spruce or pine.

An article comprising such a composite can be used for external façade cladding of buildings, exterior siding applications, structural application in screening and bracing, walls, roofs and floors, cladding for a balcony, or of a parapet panel or apron panel, or else for the internal lining of walls or furniture, or of wet-rooms or laboratory equipment.

The surface of the composite can be plain or finished with a decorative layer consisting of a coating or laminating veneer.

The prior art discloses sheets made from woodchips and from wood fibres with a matrix of synthetic resins or cement. The sheets are generally of uniform density and are not usually suitable for external applications or internal applications in damp conditions. Neither are these type of sheets maintenance-free, and generally require post-treatment on all sides due to severe water absorption through the edges or surface. Water absorption can cause severe swelling, with an increase in sheet dimensions, and a substantial loss in the mechanical strength of the material.

These materials are also unsatisfactory with respect to weather resistance. It is observed that, in weather-ability testing, strong uptake of moisture and consequent peripheral swelling and core splitting can take place after a few weeks, and as a result, cracking of the surface may occur.

Existing sheets also exhibit poor durability when measured by their resistance against biological attack, when compared to sheets produced from acetylated wood elements.

It is therefore an object of the invention to provide a wood based composite which does not exhibit the aforementioned disadvantages, but rather will show favourable and reduced swelling behaviour under the effect of varying climatic conditions.

Another object of the invention is to provide a wood based composite that has a long life span and is durable, ie that will not rot, decay or disintegrate under the influence of weather or biological attack.

Still another object of the invention is to provide a wood based composite that after being immersed in water at ambient temperature and in equilibrium therewith, for a significant period of time, will show substantially less reduction in mechanical strength properties such as a modulus of rupture and modulus of elasticity, when compared with existing composites. By 'significant period of time' is meant for several weeks or months.

Another object of the invention is to provide a wood based composite which possesses a surface that remains smooth after wetting or priming with substantially no fibres or wood elements coming loose or standing up from the surface. This enables coatings and paints to be more efficiently, and thereby cost effectively, applied. In addition this property in combination with improved dimensional stability results in a substantially longer service life for the coating and thereby lower maintenance costs. Typically, fibres or wood elements may stand up from the surface of the composite by 1 to 2 mm, giving the surface a 'hairy feel'.

A further object of the invention is the provision of a process for producing acetylated wood elements as basic raw material for producing the wood based composites according to the invention. Typically, wood elements suitable for acetylation according to the present invention are described in the table I below:—

TABLE I

| Wood Element | Length (mm) | | Width (mm) | | Thickness (mm) | |
|---|---|---|---|---|---|---|
| | From | To | From | To | From | To |
| Chips | 25 | 75 | 25 | 75 | 1.50 | 15 |
| Flakes | 15 | 75 | 15 | 75 | 0.25 | 0.50 |
| Strands | 15 | 75 | 5 | 25 | 0.25 | 0.50 |
| Splinters (slivers) | 5 | 75 | 0.15 | 0.50 | 0.15 | 0.50 |
| Particles | 1.5 | 15 | 0.15 | 1.30 | 0.15 | 1.25 |
| Fibrebundles | 1.5 | 25 | 0.15 | 0.50 | 0.15 | 0.50 |
| Fibres | 1.0 | 5 | 0.05 | 0.10 | 0.05 | 0.10 |

Suitably acetylated wood elements may be prepared either by acetylating large geometry elements, eg wafers which are then further size reduced to the desired final geometry, or by first converting green wood directly to the desired final geometry before acetylation.

Thus, the present invention comprises a composite wood product containing acetylated wood elements characterised by an average value in thickness swelling not exceeding 5% after subjection to 25 wet-dry/freeze-thaw test cycles as described in Table II.

Alternatively, the composite containing acetylated wood elements may be characterised by retaining an average value of at least 90% of its modulus of elasticity after subjection to 25 wet-dry/freeze-thaw test cycles as described in Table II.

Further, in the alternative the composite containing acetylated wood elements may be characterised by retaining an average value of at least 90% of its bending strength after subjection to 25 wet-dry/freeze-thaw test cycles as described in Table II.

Additionally, the composite containing acetylated wood elements may be characterised by retaining at least 70% of its modulus of rupture after soaking for 48 hours in water at ambient temperature.

The composite containing acetylated wood elements may also be characterised by having two or more of the above product properties.

The present invention also comprises a two stage process for the acetylation of wood elements in which the elements are (a) treated with acetic anhydride at a temperature of 30° C. to 190° C. at a pressure of atmospheric to 15 barg for up to 80 minutes and thereafter (b) heated with an inert gas which may be mixed with acetic anhydride or a mixture of acetic anhydride and acetic acid to a temperature of 150° C. to 190° C. at a pressure of 1 to 5 barg for a period of 5 to 300 minutes.

The stages (a) and (b) may readily be carried out in a suitable pressure reactor.

Preferably, the wood elements prior to acetylation are dried to a moisture content of 2% to 10% by weight of water by conventional methods.

Desirably, prior to stage (a) a vacuum is applied to the elements to remove resident gases.

Following acetylation the elements may conveniently be allowed to dry at atmospheric pressure or be vacuum dried or both.

In stage (a) acetic anhydride at a temperature of 60° C. to 130° C. is preferred, at a pressure of 8 to 12 barg for 5 to 20 minutes, while in stage (b) it is preferred to use an inert gas (e.g. nitrogen) at a temperature of 130° C. to 145° C. for 2 to 4 hours. In this stage the pressure in the reactor may rise to 1 to 3 barg, and the inert gas become fully saturated with acetic anhydride and acetic acid.

In an example of the process of the present invention wood chip (approx. 40 mm×40 mm×10 mm) derived from spruce and having a moisture content of 4%-10% by weight of water was placed in wire mesh walled baskets (to allow the easy passage of fluids), and placed in a pressure reactor. A vacuum of −0.95 barg was then applied to the chip for 5 minutes. Thereafter, pre-heated acetylation fluid (comprising of a mixture of acetic anhydride 95% and acetic acid 5%) at 130° C. was introduced into the reactor which was pressurised to 10 barg for 10 minutes. The reactor was then drained and the chip exposed to circulating nitrogen gas heated to 145° C. for 60 minutes. During this part of the process the pressure in the reactor may rise to 1-2 barg. After releasing the pressure the acetylated chip was vacuum dried at −0.92 barg and cooled for 5 to 10 hours, typically 6-7 hours in total (i.e. drying and cooling). Acetylation levels were of the order of 20% acetyl group content (measured by high performance liquid chromatography/near-infrared spectroscopy).

The acetylated chip was then broken down to fibre by passing through a conventional defibrator, combined with pMDI adhesive (see details below), and converted to composite panel or board by applying high temperature and pressure. Samples of this board together with board made from non-acetylated spruce wood fibres were then subjected to the wet-dry and freeze-thaw testing procedure (DIN EN 12467/12) described in Table II.

TABLE II

| Wet-dry cycle | Freeze-thaw cycle |
|---|---|
| Phase 1 Storage in water Storage of the test samples 500 mm × 500 mm × 12 mm in water at a temperature of 20° C. for 18 hrs. | Phase 1 Storage in water Storage of the test samples 500 mm × 500 mm × 12 mm in water at a temperature of 20° C. for 3 hrs. |
| Phase 2 - Drying Drying of the test samples in an oven for 6 hrs at a temperature of 60° C. and a relative humidity of 20%. | Phase 2 - Freezing Freezing of the test samples at a temperature of −20° C. for 3 hrs. |

After 25 wet-dry and freeze-thaw cycles of testing the average value of thickness swelling of the acetylated fibre board was 3% compared with 27% for board comprising non-acetylated wood fibre, readily demonstrating the superior value of board made from acetylated wood chip.

The following tables III to X further detail the superior performance of composites (panels) comprising acetylated wood elements according to the present invention.

Two different adhesives were used to make the panels. These were a phenol formaldehyde adhesive (PF, Hexion GmbH, designation: 'Bakelite® PF 1279 HW'), and a polymeric di-phenylmethane diisocyanate (pMDI, Bayer AG, designation: 'Desmodur 1520 A20'). The latter being the preferred adhesive.

Thickness Swelling

Measured in respect of the following panels after 24 hours submerged in water at ambient temperature.

TABLE III

| Composite (panel) Type | Wood Element (species) | Density kg/m³ | Composite (panel) thickness mm | Adhesive typed | Adhesive content % | Fibre Treatment | Thickness Swelling % |
|---|---|---|---|---|---|---|---|
| MDF | Spruce (fibre) | 800 | 12 | pMDI | 5 | Non-acetylated | 7.5 |
|  |  |  |  |  |  | Acetylated | 2.1 |
| MDF | Spruce (fibre) | 800 | 12 | PF | 10 | Non-acetylated | 33.1 |
|  |  |  |  |  |  | Acetylated | 2.2 |
| Particleboard | Radiata Pine (particles) | 650 | 12 | PF | 7.5 | Non-acetylated | 14.5 |
|  |  |  |  |  |  | Acetylated | 1.7 |
| OSB | Radiata Pine (strands) | 650 | 12 | PF | 10 | Non-acetylated | 7.1 |
|  |  |  |  |  |  | Acetylated | 1.2 |

MDF medium density fibreboard
OSB oriented strand board
Note the minimal thickness swelling 1.2% to 2.2% occurring in respect of the panel samples comprising acetylated wood elements.

Further composite samples A-F were made from wood fibre, chip or strands according to the processes of the present invention, and converted to medium density fibreboard and oriented strand board as detailed in Table IV below.

TABLE IV

| | MDF | | | | OSB | |
|---|---|---|---|---|---|---|
| Composite | | | | | | |
| | A | B | C | D | E | F |
| Wood element | Spruce (fibre) | Spruce (fibre) | Spruce (chip) | Spruce (fibre) | SYP (strands) | SYP (strands) |
| Acetylated | Yes | Yes | Yes | No | Yes | No |

TABLE IV-continued

|  | MDF Composite | | | | OSB | |
|---|---|---|---|---|---|---|
|  | A | B | C | D | E | F |
| Adhesive type | pMDI | PF | pMDI | PF | pMDI | pMDI |
| Adhesive content | 5% | 10% | 5% | 10% | 8% | 8% |
| Thickness of the board (500 mm × 500 mm) | 12 mm | 12 mm | 12 mm | 12 mm | 12 mm | 12 mm |
| Density kg/m$^3$ | 850 | 850 | 850 | 850 | 670 | 670 |

SYP Southern yellow pine

The following table V shows the effect of changes in average thickness swelling after a 25 cycle wet-dry/freeze-thaw test as described in table II. These results further demonstrate the advantageous effect on thickness swelling afforded by the use of acetylated material.

TABLE V

| Sample (table IV) | Average value of thickness swelling % |
|---|---|
| A | 3.0 |
| E | 4.0 |
| B | 4.3 |
| C | 4.3 |
| F | 21.9 |
| D | 26.8 |

Moduli of Rupture and Elasticity

Measured in respect of MDF panels made from spruce fibre after soaking for 48 hours in water at ambient temperature.

Modulus of Elasticity and Bending Strength

The following tables VII and VIII show the effect of average value changes of modulus of elasticity and bending strength respectively after a 25 cycle wet-dry/freeze-thaw test as described in Table II.

TABLE VII

| sample (table IV) | Wet dry | | | Freeze thaw | | | average value (retention of modulus) |
|---|---|---|---|---|---|---|---|
|  | start N/mm$^2$ | finish | % | start N/mm$^2$ | finish | % | % |
| E | 5717 | 5332 | 93 | 5849 | 5514 | 94 | 94 |
| C | 2664 | 2338 | 88 | 2665 | 2646 | 99 | 94 |
| B | 2673 | 2341 | 88 | 2579 | 2527 | 98 | 93 |
| A | 3521 | 3195 | 91 | 3472 | 3176 | 91 | 91 |
| F | 4968 | 2814 | 57 | 4968 | 3492 | 70 | 63 |
| D | 2010 | 782 | 39 | 2099 | 965 | 46 | 42 |

Note
(i) the minimal loss of modulus in respect of acetylated MDF samples C, B and A compared with non-acetylated sample D, and
(ii) a similar minimal loss of modulus in respect of acetylated OSB sample E compared with non-acetylated sample F.

TABLE VIII

| Sample (table IV) | Wet dry | | | Freeze thaw | | | average value (retention of strength) |
|---|---|---|---|---|---|---|---|
|  | start N/mm$^2$ | finish | % | start N/mm$^2$ | finish | % | % |
| E | 37.7 | 38.8 | 103 | 34.5 | 40.2 | 117 | 109 |
| B | 32.5 | 30.2 | 93 | 30.5 | 32.9 | 108 | 100 |
| A | 41.4 | 38.6 | 93 | 41.1 | 39.9 | 97 | 95 |
| C | 24.2 | 21.1 | 87 | 25.2 | 24.4 | 97 | 92 |

TABLE VI

| Fibre Treatment | Density kg/m3 | Moisture content before pressing % | Composite (panel) Thickness mm | Adhesive type | Adhesive content % | Testing Conditions | MOR N/mm$^2$ | MOR N/mm$^2$ | MOE N/mm$^2$ | MOE N/mm$^2$ |
|---|---|---|---|---|---|---|---|---|---|---|
| Non-acetylated | 800 | 6.8 | 12 | pMDI | 5 | dry | 45.0 |  | 3700.0 |  |
|  |  |  |  |  |  | wet |  | 16.0 |  | 950 |
|  |  |  |  |  |  | retention of modulus |  | 36% |  | 26% |
| Acetylated | 800 | 3.2 | 5.0 | pMDI | 5 | dry | 29.0 |  | 2300.00 |  |
|  |  |  |  |  |  | wet |  | 26.0 |  | 2300 |
|  |  |  |  |  |  | retention of modulus |  | 90% |  | 100% |
| Non-acetylated | 800 | 8.9 | 12.0 | PF | 10 | dry | 27.0 |  | 2400.00 |  |
|  |  |  |  |  |  | wet |  | 4.7 |  | 200 |
|  |  |  |  |  |  | retention of modulus |  | 17% |  | 8% |
| Acetylated | 800 | 6.7 | 15.0 | PF | 10 | dry | 29.0 |  | 2100.0 |  |
|  |  |  |  |  |  | wet |  | 21.0 |  | 1600 |
|  |  |  |  |  |  | retention of modulus |  | 72% |  | 76% |

MOR modulus of rupture
MOE modulus of elasticity
Note the minimal effect on MOR and MOE in respect of MDF panels made from acetylated wood elements when using pMDI adhesive.

TABLE VIII-continued

| Sample | Wet dry | | | Freeze thaw | | | average value (retention of strength) |
|---|---|---|---|---|---|---|---|
| (table | start | finish | | start | finish | | |
| IV) | N/mm² | | % | N/mm² | | % | |
| F | 41.4 | 28.1 | 68 | 41.4 | 35.8 | 86 | 77 |
| D | 21.0 | 13.9 | 66 | 23.9 | 14.5 | 61 | 63 |

Note:
(i) the minimal loss of strength in respect of acetylated MDF samples B, A and C compared with non-acetylated sample D, and
(ii) an increase in strength in respect of acetylated OSB sample E compared with a loss in non-acetylated sample F.

Surface Adhesion

Another benefit of the present invention is its advantageous effect on the surface adhesion of composites comprising acetylated wood elements, as may be demonstrated by a simple test. When a length of aluminium adhesive tape is applied to the surface of sample A, following 25 wet-dry stress cycles, virtually no fibres are found to adhere to the tape on its removal. In the case of sample B a few fibres adhere to the tape, but in contrast when the tape is removed from sample D almost 100% of the adhesive surface is covered by non-acetylated wood fibre.

The surfaces of the acetylated samples were also found to remain smooth after wetting unlike the surfaces of non-acetylated samples.

Biological Degradation

The results reported in the following two tables IX and X demonstrate a further beneficial effect of using acetylated wood elements in the manufacture of composite (panel) products in providing protection against attack by microorganisms.

It is well known that wood exposed to certain fungi and/or bacteria can deteriorate very rapidly, often with considerable loss of weight and/or strength, which is a serious limitation in the exploitation of composite products. In these experiments known test methods were used in which samples of non-acetylated and acetylated board were partially buried in soil beds under controlled temperature and moisture conditions. Subsequent examination of the samples for signs of deterioration were then made over a period of up to 72 months.

TABLE IX

Fungal cellar test on Pine Particleboard

| Months | Control (non-acetylated elements) | Comprising acetylated elements |
|---|---|---|
| 2 | 2 | 0 |
| 4 | 3 | 0 |
| 6 | 4 | 0 |
| 12 | — | 0 |
| 24 | — | 0 |
| 72 | — | 0 |

Tests conducted in non-sterile soil containing brown-, white- and soft-rot fungi, and tunnelling bacteria.
Rating system:
4 Destroyed,
3 Badly attacked,
2 Some attack,
1 Evidence of attack,
0 No attack

TABLE X

Fungal soil test on Aspen MDF

| Months | Control (non-acetylated elements) | Comprising acetylated elements |
|---|---|---|
| 24 | 4.0 | 10 |
| 36 | 1.3 | 10 |
| 48 | 1.3 | 10 |
| 60 | 1.3 | 10 |
| 72 | 0.0 | 10 |

Tests conducted in non-sterile soil containing brown-rot fungus
Rating system:
0 completely destroyed and
10 no attack

The invention claimed is:

1. A composite wood product containing acetylated wood elements characterised by an average value in thickness swelling not exceeding 5% after subjection to 25 wet-dry/freeze-thaw cycles measured according to DIN EN 12467/12, wherein one wet-dry cycle consists of storage of the test samples with dimensions 500 mm×500 mm×12 mm in water at a temperature of 20° C. for 18 hrs, followed by drying of the test samples in an oven for 6 hrs at a temperature of 60° C. and a relative humidity of 20% and wherein one freeze-thaw cycle consists of storage of the test samples with dimensions 500 mm×500 mm×12 mm in water at a temperature of 20° C. for 3 hrs, followed by freezing of the test samples at a temperature of −20° C. for 3 hrs.

2. A composite wood product containing acetylated wood elements characterised by retaining an average value of at least 90% of its modulus of elasticity after subjection to 25 wet-dry/freeze-thaw cycles measured according to DIN EN 12467/12, wherein one wet-dry cycle consists of storage of the test samples with dimensions 500 mm×500 mm×12 mm in water at a temperature of 20° C. for 18 hrs, followed by drying of the test samples in an oven for 6 hrs at a temperature of 60° C. and a relative humidity of 20% and wherein one freeze-thaw cycle consists of storage of the test samples with dimensions 500 mm×500 mm×12 mm in water at a temperature of 20° C. for 3 hrs, followed by freezing of the test samples at a temperature of −20° C. for 3 hrs.

3. A composite wood product containing acetylated wood elements characterised by retaining an average value of at least 90% of its bending strength after subjection to 25 wet-dry/freeze-dry cycles measured according to DIN EN 12467/12, wherein one wet-dry cycle consists of storage of the test samples with dimensions 500 mm×500 mm×12 mm in water at a temperature of 20° C. for 18 hrs, followed by drying of the test samples in an oven for 6 hrs at a temperature of 60° C. and a relative humidity of 20% and wherein one freeze-thaw cycle consists of storage of the test samples with dimensions 500 mm×500 mm×12 mm in water at a temperature of 20° C. for 3 hrs, followed by freezing of the test samples at a temperature of −20° C. for 3 hrs.

4. A composite wood product containing acetylated wood elements characterised by retaining at least 70% of its modulus of rupture after soaking for 48 hours in water at ambient temperature.

5. A composite wood product containing acetylated wood elements characterised by two or more of an average value in thickness swelling not exceeding 5% after subjection to 25 wet-dry/freeze-thaw cycles as described in Table II, retaining an average value of at least 90% of its modulus of elasticity after subjection to 25 wet-dry/freeze-thaw cycles measured according to DIN EN 12467/12, wherein one wet-dry cycle consists of storage of the test samples with dimensions 500 mm×500 mm×12 mm in water at a temperature of 20° C. for 18 hrs, followed by drying of the test samples in an oven for 6 hrs at a temperature of 60° C. and a relative humidity of 20% and wherein one freeze-thaw cycle consists of storage of the test samples with dimensions 500 mm×500 mm×12 mm in water at a temperature of 20° C. for 3 hrs, followed by freezing of the test samples at a temperature of −20° C. for 3 hrs, retaining an average value of at least 90% of its bending strength after subjection to 25 wet-dry/freeze-dry cycles or retaining at least 70% of its modulus of rupture after soaking for 48 hours in water at ambient temperature.

6. The composite of claim 1 characterised by the use of polymeric di-phenylmethane diisocyanate adhesive.

7. A process for the manufacture of a composite wood product from wood elements, comprising treating the wood elements with acetic anhydride at a temperature of 30° C. to 190° C. at a pressure of atmospheric to 15 barg for up to 80 minutes and thereafter heating with an inert gas which may be mixed with acetic anhydride or a mixture of acetic anhydride and acetic acid to a temperature of 150° C. to 190° C. at a pressure of 1 to 5 barg for a period of 5 to 300 minutes to make acetylated wood elements, and forming the acetylated wood elements into the composite wood product.

8. The process as claimed in claim 7 characterised in that the wood elements comprise spruce or pine.

9. The process as claimed in claim 7 characterised in that the wood elements prior to acetylation are dried to a moisture content of 2% to 10% by weight of water.

10. The process as claimed in claim 7 characterised in that prior to stage (a) a vacuum is applied to the elements to remove resident gases.

11. The process as claimed in claim 7 characterised in that the temperature in stage (a) is 60° C. to 130° C., the pressure 8 to 12 barg and time 5 to 20 minutes.

12. The process as claimed in claim 7 characterised in that the temperature in stage (b) is 130° C. to 145° C., the pressure 1 to 3 barg and time 2 to 4 hours.

13. The process as claimed in claim 12 characterised in that the pressure is 1 to 2 barg.

14. The process as claimed in claim 7 characterised in that the inert gas is nitrogen.

15. The process as claimed in claim 14 characterised in that the nitrogen is fully saturated with acetic anhydride and acetic acid.

16. A process according to claim 7, wherein the wood elements have a length of 1.0-75 mm, a width of 0.05-75 mm and a thickness of 0.05-15 mm.

17. A composite wood product obtained by the process according to claim 7.

* * * * *